United States Patent
Nakamori et al.

(10) Patent No.: US 11,978,896 B2
(45) Date of Patent: May 7, 2024

(54) NEGATIVE ELECTRODE ACTIVE MATERIAL FOR NONAQUEOUS ELECTROLYTE SECONDARY BATTERIES, NEGATIVE ELECTRODE FOR NONAQUEOUS ELECTROLYTE SECONDARY BATTERIES, AND NONAQUEOUS ELECTROLYTE SECONDARY BATTERY

(71) Applicant: Panasonic Intellectual Property Management Co., Ltd., Osaka (JP)

(72) Inventors: Toshiyuki Nakamori, Tokushima (JP); Yasunobu Iwami, Osaka (JP); Mai Yokoi, Tokushima (JP); Yohei Uchiyama, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 513 days.

(21) Appl. No.: 17/267,979

(22) PCT Filed: Aug. 1, 2019

(86) PCT No.: PCT/JP2019/030199
§ 371 (c)(1),
(2) Date: Feb. 11, 2021

(87) PCT Pub. No.: WO2020/044931
PCT Pub. Date: Mar. 5, 2020

(65) Prior Publication Data
US 2021/0167372 A1    Jun. 3, 2021

(30) Foreign Application Priority Data
Aug. 30, 2018 (JP) .................... 2018-161948

(51) Int. Cl.
*H01M 4/48* (2010.01)
*H01M 4/02* (2006.01)
(Continued)

(52) U.S. Cl.
CPC ............ *H01M 4/48* (2013.01); *H01M 4/364* (2013.01); *H01M 4/366* (2013.01); *H01M 4/386* (2013.01);
(Continued)

(58) Field of Classification Search
CPC ....................................... H01M 4/48
See application file for complete search history.

(56) References Cited

U.S. PATENT DOCUMENTS

2003/0215711 A1  11/2003  Aramata et al.
2005/0233213 A1* 10/2005  Lee .................... H01M 4/0402
                                               423/325
(Continued)

FOREIGN PATENT DOCUMENTS

CN       111357140 A    6/2020
EP       3734723 A1    11/2020
(Continued)

OTHER PUBLICATIONS

The Extended European Search Report dated Sep. 21, 2021, issued in counterpart EP Application No. 19854318.3. (8 pages).
(Continued)

*Primary Examiner* — Maria Laios
*Assistant Examiner* — Jordan E Berresford
(74) *Attorney, Agent, or Firm* — WHDA, LLP

(57) ABSTRACT

A negative electrode active material according to one embodiment of the present disclosure comprises: a composite oxide phase that contains Li, Si, Al and B; and Si particles that are dispersed in the composite oxide phase. Relative to the total number of moles of elements (excluding O) con-
(Continued)

tained in the composite, oxide phase, the content of Li is from 5% by mole to 20% by mole (inclusive), the content of Si is from 50% by mole to 70% by mole (inclusive), the content of Al is from 12% by mole to 25% by mole (inclusive), and the content of B is from 12% by mole to 25% by mole (inclusive).

5 Claims, 2 Drawing Sheets

(51) Int. Cl.
 *H01M 4/36* (2006.01)
 *H01M 4/38* (2006.01)
 *H01M 10/0525* (2010.01)

(52) U.S. Cl.
 CPC .. *H01M 10/0525* (2013.01); *H01M 2004/027* (2013.01); *H01M 2004/028* (2013.01); *H01M 2300/0017* (2013.01)

(56) References Cited

U.S. PATENT DOCUMENTS

| | | |
|---|---|---|
| 2007/0190413 A1 | 8/2007 | Lee et al. |
| 2017/0214041 A1 | 7/2017 | Minami et al. |
| 2017/0309950 A1 | 10/2017 | Minami et al. |
| 2018/0287148 A1 | 10/2018 | Akira et al. |
| 2018/0287193 A1 | 10/2018 | Matsuno et al. |
| 2020/0350563 A1 | 11/2020 | Uchiyama et al. |

FOREIGN PATENT DOCUMENTS

| | | |
|---|---|---|
| EP | 3748739 A1 | 12/2020 |
| EP | 3859828 A1 | 8/2021 |
| JP | 2004-47404 A | 2/2004 |
| JP | 2007-500421 A | 1/2007 |
| JP | 2017-91978 A | 5/2017 |
| WO | 2016/035290 A1 | 3/2016 |
| WO | 2016/121320 A1 | 8/2016 |
| WO | 2016/136180 A1 | 9/2016 |
| WO | 2019/065766 A1 | 4/2019 |

OTHER PUBLICATIONS

International Search Report dated Nov. 5, 2019, issued in counterpart Application No. PCT/JP2019/030199. (2 pages).
English Translation of Chinese Office Action dated Feb. 8, 2024 issued in counterpart Chinese Patent Application No. 201980055317.6. (4 pages).

* cited by examiner

NEGATIVE ELECTRODE ACTIVE MATERIAL FOR NONAQUEOUS ELECTROLYTE SECONDARY BATTERIES, NEGATIVE ELECTRODE FOR NONAQUEOUS ELECTROLYTE SECONDARY BATTERIES, AND NONAQUEOUS ELECTROLYTE SECONDARY BATTERY

TECHNICAL FIELD

The present disclosure relates to a negative electrode active material or non-aqueous electrolyte secondary batteries, a negative electrode for non-aqueous electrolyte secondary batteries, and a non-aqueous electrolyte secondary battery.

BACKGROUND ART

As a negative electrode active material for non-aqueous electrolyte secondary batteries, a Si-based active material containing silicon (Si) or a carbon-based active material such as graphite is used. It is known that Si-based active materials may absorb more lithium ions per unit mass than carbon-based active materials such as graphite. In particular, the Si-based active materials represented by $SiO_x$ in which Si particles are dispersed in an amorphous $SiO_2$ phase are suitable for the negative electrode active material of non-aqueous electrolyte secondary batteries because the volume change due to lithium ion absorption is smaller than when Si is used alone. For example, PATENT LITERATURE 1 discloses a non-aqueous electrolyte secondary battery using $SiO_x$ as a negative electrode active material.

On the other hand, the non-aqueous electrolyte secondary battery using $SiO_x$ as the negative electrode active material has a problem of a lower initial charging and discharging efficiency than that of a battery using a carbon-based active material as the negative electrode material. This is mainly due to the irreversible reaction of $SiO_2$ to $Li_4SiO_4$ during charging and discharging. Therefore, in order to suppress such an irreversible reaction and improve the initial charging and discharging efficiency, a Si-based active material in which Si particles are dispersed in a lithium silicate phase has been proposed (see, for example, PATENT LITERATURES 2 and 3).

CITATION LIST

Patent Literature

PATENT LITERATURE 1: Japanese Unexamined Patent Application Publication No. 2004-47404
PATENT LITERATURE 2: International Publication No. WO 2016/35290
PATENT LITERATURE 3: International Publication No, WO 2016/121320

SUMMARY

However, the conventional Si-based active material including a lithium silicate phase has a problem of dissolution of the constituent components of the lithium silicate phase into the negative electrode mixture slurry used for forming the negative electrode mixture layer. When the constituent components of the lithium silicate phase are dissolved, the dissolved components react with the binder, causing problems such as reduced adhesion of the negative electrode mixture layer to the negative electrode core body.

The negative electrode active material for a non-aqueous electrolyte secondary battery, which is one aspect of the present disclosure, includes a composite oxide phase containing lithium (Li), silicon (Si), aluminum (Al), and boron (B), and Si particles dispersed in the composite oxide phase. The content of Li is 5 mol % or more and 20 mol % or, less, the content of Si is 50 mol % or more and 70 mol % or less, the content of Al is 12 mol % or more and 25 mol % or less, and the content of B is 12 mol % or more and 25 mol % or less, based on the total number of moles of the elements excluding oxygen (O) contained in the composite oxide phase.

The negative electrode for a non-aqueous electrolyte secondary battery, which is one aspect of the present disclosure, has a negative electrode core body and a negative electrode mixture layer formed on both sides of the negative electrode core body, and the negative electrode mixture layer includes the negative electrode active material. The non-aqueous electrolyte secondary battery according to one aspect of the present disclosure comprises the negative electrode, the positive electrode, and the non-aqueous electrolyte.

According to the negative electrode active material, which is one aspect of the present disclosure, dissolution of the constituent components of the composite oxide phase into the negative electrode mixture slurry is suppressed. As a result, the occurrence of defects due to the dissolution of the constituent components, such as reduced adhesion of the negative electrode mixture layer to the negative electrode core body, is suppressed.

DESCRIPTION OF EMBODIMENTS

As mentioned above, the conventional Si-containing compound represented by $SiO_x$ has a structure in which fine Si particles are dispersed in an amorphous $SiO_2$ phase, and the following reaction occurs during charging and discharging.

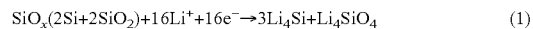

$$SiO_x(2Si+2SiO_2)+16Li^++16e^-\rightarrow 3Li_4Si+Li_4SiO_4 \tag{1}$$

The following equations are obtained by decomposing Equation 1 for Si and $2SiO_2$.

$$Si+4Li^++4e^-\rightarrow Li_4Si \tag{2}$$

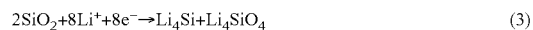

$$2SiO_2+8Li^++8e^-\rightarrow Li_4Si+Li_4SiO_4 \tag{3}$$

Equation 3 is an irreversible reaction, and the formation of $Li_4SiO_4$ is a major factor in reducing the initial charging and discharging efficiency.

The negative electrode active material according to the present disclosure is a Si-based active material having a structure in which Si particles are dispersed in a composite oxide phase containing lithium (Li) and silicon (Si), and the content of $SiO_2$ is significantly lower than that of conventional $SiO_x$. Therefore, in a non-aqueous electrolyte secondary battery using the negative electrode active material, it is considered that the reaction of Equation 3 is unlikely to occur and the initial charging and discharging efficiency is improved.

Further, in the negative electrode active material according to the present disclosure, the composite oxide phase contains a specific amount of aluminum (Al) and boron (B). The present inventors have found that the dissolution of the constituent components of the composite oxide phase is specifically suppressed by adding a specific amount of Al and B to the composite oxide phase containing Li and Si. Therefore, by using the negative electrode active material according to the present disclosure, it is possible to suppress the occurrence of defects due to the dissolution of the constituent components of the composite oxide phase while increasing the capacity of the battery and improving the initial charging and discharging efficiency.

With reference to the drawings, an example of the embodiment of the present disclosure will be described in detail below, but the disclosure is not limited to the embodiments described below. In the following, as the non-aqueous electrolyte secondary battery, a laminated battery (non-aqueous electrolyte secondary battery 10) comprising the external packaging 11 composed of the laminated sheets 11a and 11b will be illustrated. However, the non-aqueous electrolyte secondary battery according to the present disclosure may be a cylindrical battery comprising a cylindrical battery case, a square battery comprising a square battery case, or the like, and the form of the battery is not particularly limited.

Figure 1:
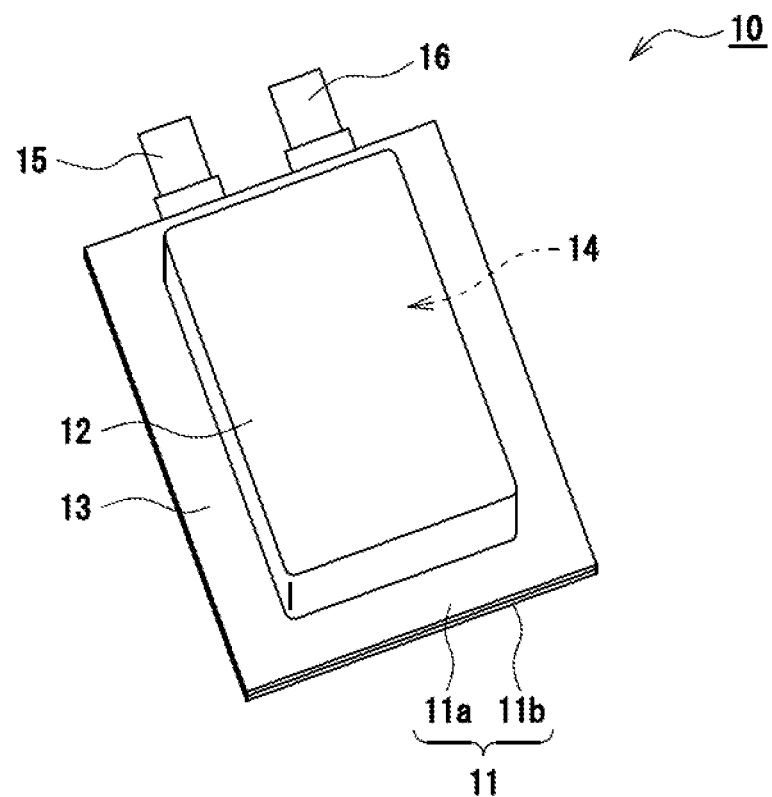
FIG. 1 is a perspective view of a non-aqueous electrolyte secondary battery, which is an example of an embodiment.

FIG. 1 is a perspective view of the non-aqueous electrolyte secondary battery 10, which is an example of the embodiment. The non-aqueous electrolyte secondary battery 10 comprises an electrode assembly 14 and a non-aqueous electrolyte, and these are housed in a housing part 12 of the external packaging 11. A sheet comprising a metal layer and a resin layer laminated together is used for the laminated sheets 11a and 11b. The laminated sheets 11a and 11b have, for example, two resin layers sandwiching a metal layer, and the one resin layer is made of a resin that can be thermocompression bonded. An example of a metal layer is an aluminum layer.

The external packaging 11 has, for example, an approximately rectangular shape in a plan view. A sealed part 13 is formed in the external packaging 11 by joining the laminated sheets 11a and 11b together, thereby sealing the housing part 12 in which the electrode assembly 14 is housed. The sealed part 13 is formed in a frame shape with approximately the same width along the edge of the external packaging 11. The approximately rectangular portion in the plan view surrounded by the sealed part 13 is the housing part 12. The housing part 12 is provided by forming a recess capable of accommodating the electrode assembly 14 in at least one Of the laminated sheets 11a and 11b. In the present embodiment the recess is formed in the laminated sheet The non-aqueous electrolyte secondary battery 10 comprises a pair of electrode leads (positive electrode lead 15 and negative electrode lead 16) connected to the electrode assembly 14. Each electrode lead is drawn from the interior of the external packaging 11. In the example shown in FIG. 1, each electrode lead is drawn from the same end edge of the external packaging 11 in an approximately parallel manner to each other. The positive electrode lead 15 and the negative electrode lead 16 are both conductive thin plates. For example, the positive electrode lead 15 is made of a metal mainly composed of aluminum, and the negative electrode lead 16 is made of a metal mainly composed of copper or nickel.

Figure 2:
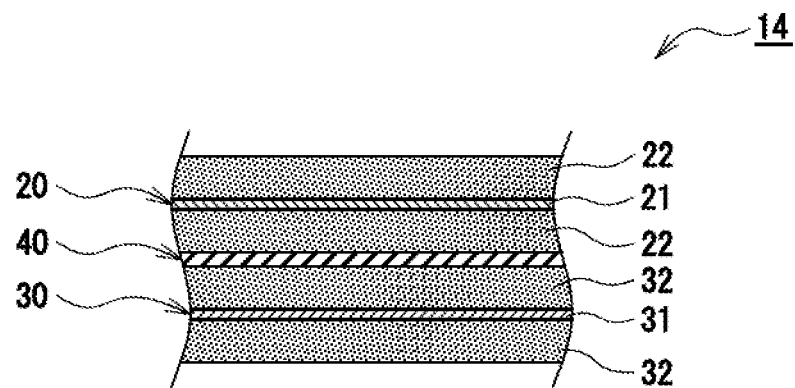
FIG. 2 is a partial cross sectional plan view of an electrode assembly, which is example of an embodiment.

The electrode assembly 14 has a positive electrode 20, a negative electrode 30, and a separator 40 interposed between the positive electrode 20 and the negative electrode 30, as shown in FIG. 2. The electrode assembly 14 has a winding structure in which, for example, the positive electrode 20 and the negative electrode 30 are wound through the separator 40, and is a diametrically pressed flat wound electrode assembly. The negative electrode 30 is formed to have a size one size larger than that of the positive electrode 20 in order to suppress the precipitation of lithium. The electrode assembly may be a stack type in which a plurality of positive electrodes and a plurality of negative electrodes are alternately stacked via separators one by one unit cell.

The non-aqueous electrolyte includes a non-aqueous solvent and an electrolyte salt dissolved in the non-aqueous solvent. As the non-aqueous solvent, for example, esters, ethers, nitriles, amides, and mixtures of two or more of these solvents may be used. The non-aqueous solvent may contain a halogen substituent in which at least a part of hydrogen in these solvents is substituted with a halogen atom such as fluorine. The non-aqueous electrolyte is not limited to the liquid electrolyte, and y be a solid electrolyte using a gel polymer or the like. As the electrolyte salt, a lithium salt such as $LiPF_6$ is used.

The positive electrode 20, the negative electrode 30, and the separator 40 which constitutes the electrode assembly 14 Will be described in detail below, and in particular, the negative electrode 30 and the negative electrode active material 33 (see FIG. 3 described later) for forming the negative electrode 30 will be described in detail.

[Positive Electrode]

The positive electrode 20 has a positive electrode core body 21 and a positive electrode mixture layer 22 formed on both sides of the positive electrode core body 21. For the positive electrode core body 21, a foil of a metal stable in the potential range of the positive electrode 20, such as aluminum or an aluminum alloy, a film in which the metal is arranged on the surface layer, and the like may be used. The positive electrode mixture layer 22 includes a positive electrode active material, a conductive agent, and a binder. The positive electrode 20 may be produced by applying a positive electrode mixture slurry including a positive electrode active material, a conductive agent, a binder, and the like on the positive electrode core body 21, drying the coating film, and then compressing it to form the positive electrode mixture layer 22 on both sides of the positive electrode core body 21.

The positive electrode active material is composed mainly of a lithium-containing metal composite oxide. Elements contained in the lithium-containing metal composite oxide include Ni, Co, Mn, Al, B, Mg, Ti, V, Cr, Fe, Cu, Zn, Ga, Sr, Zr, Nb, In, Sn, Ta and W. An example of a suitable lithium-containing metal composite oxide is a composite oxide containing at least one of Ni, Co, Mn, and Al. Inorganic compound particles such as aluminum oxide and lanthanoid-containing compounds may be fixed to the particle surface of the lithium-containing metal composite oxide.

Examples of the conductive agent included in the positive electrode mixture layer 22 include carbon materials such as carbon black, acetylene black, ketjen black, and graphite. Examples of the binder included in the positive electrode mixture layer 22 include a fluororesin such as polytetrafluoroethylene (PTFE) or polyvinylidene fluoride (PVdF), polyacrylonitrile (PAN), polyimide acrylic resin, and polyolefin. These resins. may be used in combination with cellulose derivatives such as carboxymethyl cellulose (CMC) or salts thereof, polyethylene oxide (PEO) and the like.

[Negative Electrode]

The negative electrode 30 has a negative electrode core body 31 and a negative electrode mixture layer 32 formed on both sides of the negative electrode core body 31. For the negative electrode core body 31, a foil of a metal stable in the potential range of the.

negative electrode 30 such as copper or a copper alloy, a film in which the metal is arranged on the surface layer, and the like may be used. The negative electrode mixture layer 32 includes a negative electrode active material and a binder. The negative electrode 30 may be produced by applying a negative electrode mixture slurry including a negative electrode active material, a binder, and the like on the negative electrode core body 31, drying the coating film, and then compressing it to form the negative electrode mixture layer 32 on both sides of the negative electrode core body 31.

As the binder included in the negative electrode mixture layer 32, a fluororesin such as PTFE or PVdF, PAN, polyimide, acrylic resin, poly-olefin or the like may be used as in the case of the positive electrode 20, but preferably styrene-butadiene rubber (SBR) is used. Further, the negative electrode mixture layer 32 may include CMC or a salt thereof, polyacrylic acid (PAA)) or a salt thereof polyvinyl alcohol (PVA) and the like. The negative electrode mixture layer 32 includes, for example, SBR and CMC or a salt thereof.

The negative electrode mixture layer 32 includes a Si-based active material having a structure in which Si particles are dispersed in a composite oxide phase containing Li and Si. The Si-based active material may absorb More lithium ions than the carbon-based active material such as graphite, therefore the use of the Si-based active material as the negative electrode active material contributes to increasing the capacity of the battery. In the negative electrode mixture layer 32, only the Si-based active material may be used alone as the negative electrode active material. However, since the Si-based active material has a larger volume change due to charging and discharging than the carbon-based active material, the carbon-based active material is preferably used together with the Si-based active material in order to maintain good cycle characteristics while increasing the capacity.

Figure 3:
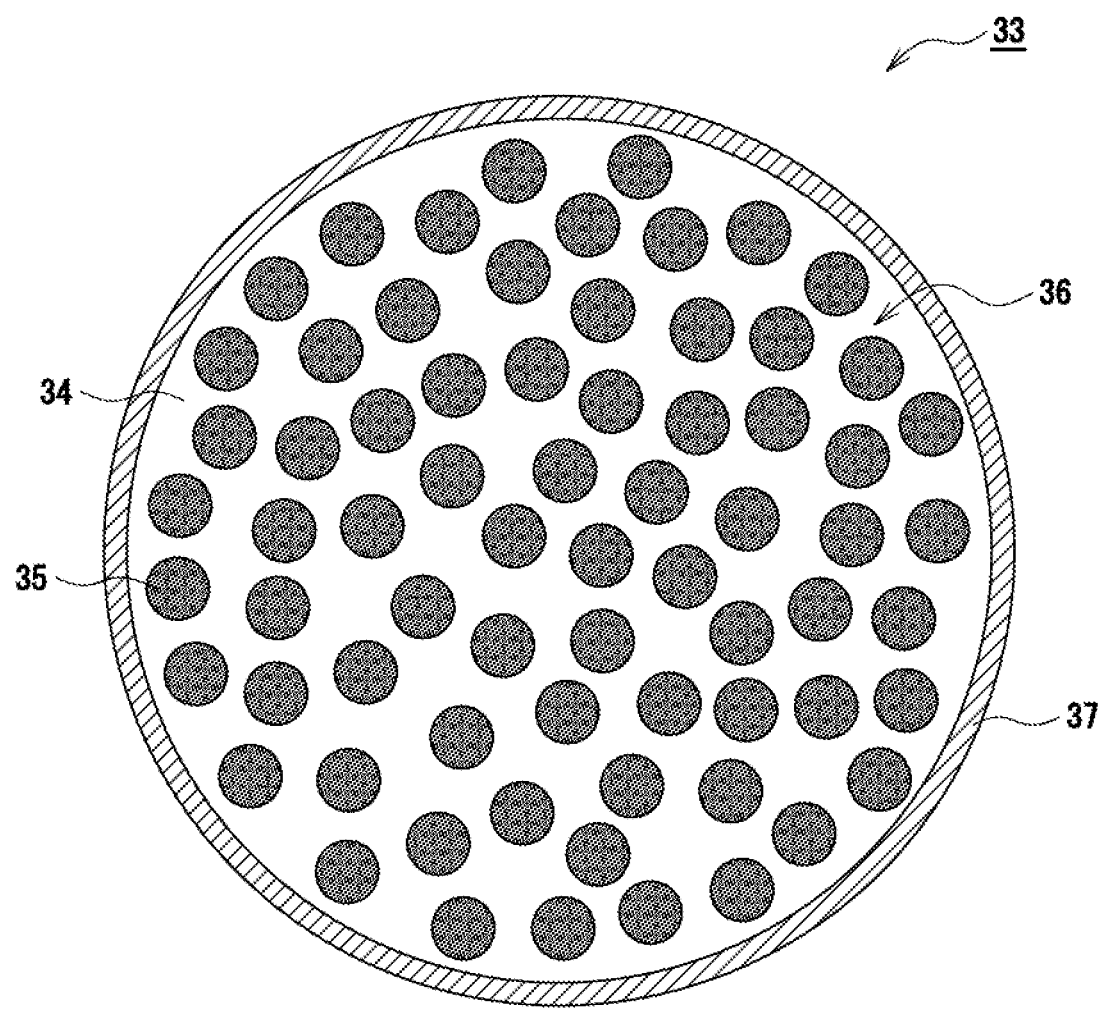
FIG. 3 is a cross sectional plan view schematically showing a negative electrode: active material, which is an example of an embodiment.

FIG. 3 is a schematic cross sectional plan view of the negative electrode active material 33, which is an example of an embodiment. The negative electrode active material 33 is a Si-based active material including a composite oxide phase 34 containing Li, Si, Al, and B, and Si particles 35 dispersed in the composite oxide phase 34, as illustrated in FIG. 3. The $SiO_2$ included in the negative electrode active material 33 is preferably about the amount of a natural oxide film, and no peak of $SiO_2$ is preferably observed at $2\theta=25°$ in the XRD pattern obtained by XRD measurement of the negative electrode active material 33. The negative electrode active material 33 preferably has a conductive coating 37 that covers the surface of the mother particle 36 composed of the composite oxide phase 34 and the Si particles 35.

The mother particle 36 may include components other than the composite oxide phase 34 and the Si particle 35 within a range that does not impair the object of the present disclosure. When the mother particle 36 includes $SiO_2$ of native oxide film, the content thereof is preferably less than 10% by mass, more preferably less than 7% by mass. The negative electrode active material 33 may achieve an increase in capacity and improved initial charging and discharging efficiency equal to or higher than that of the conventional Si-based active material in which Si particles are dispersed in the lithium silicate phase.

The composite oxide phase 34 is composed of a composite oxide containing Li, Si, Al, and B, as described above. The content of Li is 5 mol % or more and 20 mol % or less, the content of Si is 50 mol % or more and 70 mol % or less, the content of Al is 12 mol % or more and 25 mol % or less, and the content of B is 12 mol % or more and 75 mol % or less, based on the total number of moles of the elements excluding O contained in the composite oxide phase 34. In this case, when the negative electrode active material 33 is added to the negative electrode mixture slurry, it is possible to suppress the dissolution of the constituent components of the composite oxide phase 34 into water, and the occurrence of defects caused by the dissolution of constituent components, such as reduced adhesion of the negative electrode mixture layer to the negative electrode core body, is suppressed.

The contents of Al and B contained in the composite oxide phase 34 are preferably or less, more preferably 15 mol % or less, based on the total number of moles of the elements excluding 0 contained the composite oxide phase 34. The composite oxide phase 34 may contain elements other than Li, Si, Al, B, and O within a range that does not impair the object of the present disclosure, but substantially only the five elements are preferably contained.

A content ratio between Al and B contained in the composite oxide phase 34 is not particularly limited, but one suitable example thereof is 4:6 to 6:4. The content ratio between Al and B may be approximately unity (5:5). Al and B are each contained in the amount of, for example, 12 mol % or more and 20 mol % or less, or 1 mol % or more and 15 mol % or less, based on the total number of moles of Li, Si, Al, and B contained in the composite oxide phase 34, and the content ratio is 4:6 to 6:4.

In the composite oxide phase 34, for example, Al and B are solid-solved inn the composite oxide. The solid solutions of Al and B may be confirmed by using energy dispersive X-ray spectroscopy (EDS). Alternatively, Al and B may be scattered in the lithium silicate phase composed of Li and Si. In this case, a suitable lithium silicate is represented by $Li_{2z}SiO_{(2+z)}$ ($0<z<2$) and is mainly composed of $Li_2SiO_3$ ($Z=1$) or $Li_2Si_2O_5$ ($Z=½$).

The composite oxide phase 34 is composed of a set of fine particles such as lithium silicate, for example. The composite oxide phase 34 may be composed of finer particles than the Si particles 35. In the XRD pattern of the negative electrode active material 33, the intensity of the (111) peak of Si may be greater than the intensity of the (111) peak of lithium silicate.

The Si particles 35 are preferably dispersed approximately uniformly in the composite oxide phase 34. The mother particle 36 has a sea island structure in which fine Si particles 35 are dispersed in the matrix of the composite oxide phase 34, and in any cross-section, the Si particles 35 are scattered approximately uniformly without being unevenly distributed in some areas. The content of the Si particles 35 is preferably 20% by mass to 95% by mass, more preferably 35% by mass to 75% by mass, based on the total mass of the mother particle 36. If the content of the Si particles 35 is too low, the charging and discharging capacity may decrease, and the load characteristics may be deteriorated due to poor diffusion of lithium ions. If the content of the Si particles 35 is too high, for example, a part of Si is not covered with the composite oxide phase 34 and is exposed and comes into contact with the electrolyte solution, thus the cycle characteristics are deteriorated.

The average particle size of the Si particles 35 is, for example, 500 nm or less, preferably 200 nm or less and more preferably 50 nm or less before charging, and discharging. After charging and discharging, 400 nm or less is preferable, and 100 nm or less is more preferable. By making the Si particles 35 finer, the volume change during charging and discharging becomes small, and it becomes easy to suppress the collapse of the electrode structure. The average particle size of the Si particles 35 is measured by observing a cross section of the negative electrode active material 33 using a scanning electron microscope (SEM) or a transmission electron microscope (TEM). Specifically, it is obtained by measuring the diameter of the circumscribed circle of 100 Si particles 35 selected from SEM or TEM images of the particle cross section and averaging the measured values.

The median diameter ($D_{50}$, medium diameter) of the negative electrode active material 33 is preferably 1 μm to 15 μm, more preferably 4 μm to 10 μm, from the viewpoint of increasing the capacity of the battery and improving the cycle characteristics and the like. The median diameter of the negative electrode active material 33 is a particle size at which the volume integrated value is 50% in the particle size distribution measured by the laser diffraction scattering method. If the median diameter of the negative electrode active material 33 becomes too small, the amount of reaction with the electrolyte tends to increase and the capacity tends to decrease. On the other hand, if the median diameter becomes too large, the volume change due to charging and discharging tends to be large and the cycle characteristics tend to be deteriorated.

The negative electrode active material 33 is produced, far example, through the following steps 1 to 3.

(1) Each powder of Li-containing oxide, Si-containing oxide, Al-containing oxide, and B-containing oxide is mixed at a predetermined mass ratio.

(2) Next, using a ball mill, the above mixture is pulverized into fine particles. Each raw material powder may be made into fine particles and then mixed.

(3) The pulverized mixture is heat-treated, for example, at 600 to 1000° C. in an inert atmosphere to synthesize a composite oxide containing Li, Si, Al, and B.

(4) The above composite oxide and Si particles are mixed in a predetermined mass ratio, pulverized and mixed using a ball mill in an inert atmosphere, and then heat-treated at a temperature lower than (3) (e.g., 500° C. to 700° C.) using a heating device capable of applying pressure, such as a hot press. By pulverizing the sintered body so that the median diameter is about 1 μm to 15 μm, mother particles 36 in which Si particles 35 are dispersed in the composite oxide phase 34 are obtained.

(5) Next, the mother particles 36 are mixed with a carbon material such as coal pitch and heat-treated in an inert atmosphere. Thus, the negative electrode active material 33 in which the conductive coating 37 is formed on the surface of the mother particles 36 is obtained.

The negative electrode active material 33 preferably has a conductive coating 37 on the particle surface which is formed of a material having a higher conductivity than the composite oxide phase 34. As the conductive material for forming the conductive coating 37, an electrochemically stable material is preferable, and at least one selected from the group consisting of a carbon material, a metal, and a metal compound is preferable. Among them, the use of a carbon material is particularly preferable. Examples of the method of carbon-coating the surface of the mother particles 36 include a CVD method using acetylene, methane or the like, and a method of mixing coal pitch, petroleum pitch, phenol resin or the like with the mother particles 36 and performing heat treatment. A carbon coating layer may be formed by fixing a conductive agent such as carbon black or Ketjen black to the surface of the mother particles 36 using a binder.

The conductive coating is preferably formed so as to cover approximately the entire surface of the mother particles 36. The thickness of the conductive coating 37 is preferably 1 to 200 nm, more preferably 5 to 100 nm, in view of ensuring conductivity and diffusivity of lithium ions to the mother particles 36. If the thickness of the conductive coating 37 becomes too thin, the conductivity decreases, and it becomes difficult to uniformly coat the mother particles 36. On the other hand, if the thickness of the conductive coating 37 becomes too thick, the diffusion of lithium ions into the mother particles 36 is inhibited, and the capacity tends to decrease. The thickness of the conductive coating 37 may be measured by cross-sectional observation of the particles using SEM or TEM or the like.

The carbon-based active material used together with the negative electrode active material 33, which is an example of the above embodiment, includes graphites that have been conventionally used as negative electrode active materials, for example, natural graphites such as scaly graphite, massive graphite, and earthy graphite, as well as artificial.

graphites such as massive artificial graphite (MAG) and graphitized mesophase carbon microbeads (MCMB). When the carbon-based active material is used together, the mixing ratio of the Si-based active material and the carbon-based active material is preferably 1:99 to 30:70 by mass. When the mass ratio of the Si-based active material and the carbon-based active material is within the above range, it is easy to achieve both high capacity and improved cycle characteristics.

[Separator]

As the separator 40, a porous sheet having ion permeability and insulating property is used. Specific examples of the porous sheet include a microporous thin film, a woven fabric, and a non-woven fabric. As the material of the separator 40, an olefin resin such as polyethylene or polypropylene, cellulose or the like is suitable The separator 40 may have either a single-layer structure or a laminated structure. A heat-resistant layer or the like may be thrilled on the surface of the separator 40.

EXAMPLES

The present disclosure will be further described below with reference to Examples, but the present disclosure is not limited to these Examples.

Example 1

[Preparation of Negative Electrode Active Material (Si-based Active Material)]

Each oxide containing each element of Li, Si, Al, and B was finely mixed with a planetary ball mill and heat-treated under the conditions of 875° C. for 5 hours in an inert atmosphere to obtain composite oxides containing, Li, Si, Al, and B. The composite oxide and Si particles were finely mixed using a planetary ball mill an inert atmosphere, and then the mixture was hot-pressed in an inert atmosphere and heat-treated at 600° C. for 4 hours while applying pressure to the material to obtain the sintered body of the mixture. Si-based active material particles (mother particles) were obtained by pulverizing the sintered body so that the median diameter was 10 μm. The particles were mixed with coal pitch and heat-treated at 800° C. in an inert atmosphere to form a conductive coating made of carbon on the surface of the particles.

[Analysis of Si-based Active Material]

The particle cross section of the Si-based active material was observed by SEM, and it was confirmed that the Si particles were approximately uniformly dispersed in the matrix composed of the composite oxide. The average particle size of the Si particles was less than 50 nm. The contents of Li, Si, Al, and B contained in the composite oxide phase may be measured by ICP emission spectrometry.

[Preparation of Negative Electrode]

A mixture of the Si-based active material and graphite (carbon-based active material) in a mass ratio of 5:95 was used as the negative electrode active material. The negative electrode active material, the sodium salt of carboxymethyl cellulose (CMC-Na), and the dispersion of styrene-butadiene (SBR) were mixed in a sold content mass ratio of 97.5:1:1.5, and an appropriate amount of Water was added to prepare a negative electrode mixture slurry. Next, the negative electrode mixture slurry was applied to both sides of the negative electrode core body made of copper foil, and the coating film was dried, and then compressed using a roller. By cutting to a predetermined electrode size, a negative electrode having a negative electrode mixture layer with a filling density of 1.6 g/cm$^3$ formed on both sides of the negative electrode core body was prepared.

[Measurement of Peel Strength of Negative Electrode Mixture Layer]

The surface of the negative electrode (i.e., the surface of the mixture layer) was attached to a plastic plate via a double-sided tape (tape width 5 mm), and the negative electrode was peeled off perpendicularly from the plastic plate using a peeling tester to measure the peel strength of the negative electrode mixture layer. The evaluation results are shown in Table 1. The peel strength of Examples 2 and Comparative Examples 1 to 4 described below is a relative value where the peel strength of Example 1 is 100.

[Measurement of the Amount of Li, Al, and B Dissolved in Water]

To 100 g of water was added 0.5 g of the above Si-based active material, and the mixture was stirred. After standing for 1 hour, Li, Al, and B dissolved in water were quantified by ICP. The evaluation results are shown in Table 1. The amount of dissolution shown in Table 1 is a value calculated as a ratio of the quantitative value of each element by ICP to the content of each element in the composite oxide phase before measurement. The larger the amount of dissolution, the larger the amount of dissolution into the negative electrode mixture slurry.

Example 2 and Comparative Examples 1 to 4

The negative electrode active material and the negative electrode were prepared and evaluated in the same way as in Example 1, except that the mixing ratio of each element in the composite oxide phase was changed so that the contents of Li, Si, Al, and B were the values shown in Table 1.

TABLE 1

| | Element content of composite oxide phase (mol %) | | | | Peel strength of negative | Amount of dissolution | | |
|---|---|---|---|---|---|---|---|---|
| | Li | Si | Al | B | electrode mixture layer | Li | Al | B |
| Example 1 | 9 | 63 | 14 | 14 | 100 | 1.3% | 0.2% | 3.7% |
| Example 2 | 16 | 58 | 13 | 13 | 94 | 5.6% | 0.3% | 10.9% |
| Comparative Example 1 | 16 | 62 | 11 | 11 | 86 | 21.9% | 3.1% | 72.0% |
| Comparative Example 2 | 11 | 77 | 6 | 6 | 83 | 33.1% | 0.5% | 89.0% |
| Comparative Example 3 | 21 | 52 | 16 | 11 | 82 | 26.6% | 4.8% | 98.0% |
| Comparative Example 4 | 11 | 66 | 6 | 17 | 79 | 28.3% | 0.5% | 99.0% |

As can be understood from the results shown in Table 1, the Si-based active material of Examples significantly suppresses the amount of dissolution of the components contained in the composite oxide phase compared with the Si-based active material of Comparative Examples. The peel strength, which indicates the adhesion of the negative electrode mixture, was good for the negative electrode with the Si-based active material of Examples. The amount of dissolution of Li was specifically improved by setting the respective contents of Al and B to 13 mol % (or 12 mol %), and therefore, the peel strength of the negative electrode mixture was also significantly improved. (See Example 2 and Comparative Example 1). When the content of only one of Al or B was even 12 mol % or more, the effect of suppressing Li dissolution was not attained (see Comparative Examples 3 and 4).

It is considered that when Li is dissolved from the composite oxide phase which constitutes the Si-based active material, the aqueous solution is biased toward alkali, deterioration of the hinder component occurs, and the adhesion of the negative electrode mixture layer to the negative electrode core body is reduced. Further, even when the. polyvalent ion is dissolved, it acts on the binder component to cause a decrease in adhesion. By adding specific amounts of Al and B to the composite oxide phase, dissolution of both Li and polyvalent ion is suppressed, and it is possible to suppress a decrease in the adhesion of the negative electrode mixture.

REFERENCE SIGNS LIST 10 non-aqueous electrolyte secondary battery
11 external packaging
11a, 11b laminated sheet
12 housing part
13 sealed part
14 electrode assembly
15 positive electrode lead
16 negative electrode lead
20 positive electrode
21 positive electrode core body
22 positive electrode mixture layer
30 negative electrode
31 negative electrode core body
32 negative electrode mixture layer
33 negative electrode active material
34 composite oxide phase
35 Si particles
36 mother particles
37 conductive coating
40 separator

The invention claimed is:

1. negative electrode active material for non-aqueous electrolyte secondary batteries, comprising:
    a composite oxide phase containing lithium (Li), silicon (Si), aluminum (Al), and boron (B); and
    Si particles dispersed in the composite oxide phase, wherein
    a content of Li is 5 mol % or more and 20 mol % or less, a content of Si is 50 mol % or more and 70 mol % or less, a content of Al is 12 mol % or more and 25 mol % or less, and a content of B is 12 mol % or more and 25 mol % or less based on a total number of moles of elements excluding oxygen (O) contained in the composite oxide phase.

2. The negative electrode active material for non-aqueous electrolyte secondary batteries according to claim 1, wherein the contents of Al and B are each 12 mol % or more and 15 mol % or less, based on the total number of moles of the elements excluding O contained in the composite oxide phase.

3. The negative electrode active material for non-aqueous electrolyte secondary batteries according to claim 1, wherein a content ratio between Al and B contained in the composite oxide phase is 4:6 to 6:4.

4. A negative electrode for non-aqueous electrolyte secondary batteries, comprising:
    a negative electrode core body; and
    negative electrode mixture layers formed on both sides of the negative electrode core body, wherein
    the negative electrode mixture layer includes the negative electrode active material according to claim 1.

5. A non-aqueous electrolyte secondary battery comprising:
    the negative electrode according to claim 4;
    a positive electrode; and
    a non-aqueous electrolyte.

* * * * *